Aug. 21, 1956     H. C. FORCE     2,759,321
COMBINED MOWER AND MULCH MACHINE
Filed Jan. 24, 1955
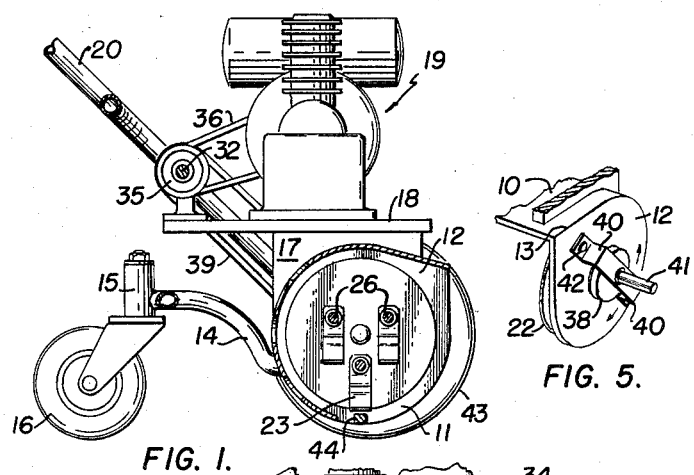
FIG. 1.
FIG. 5.
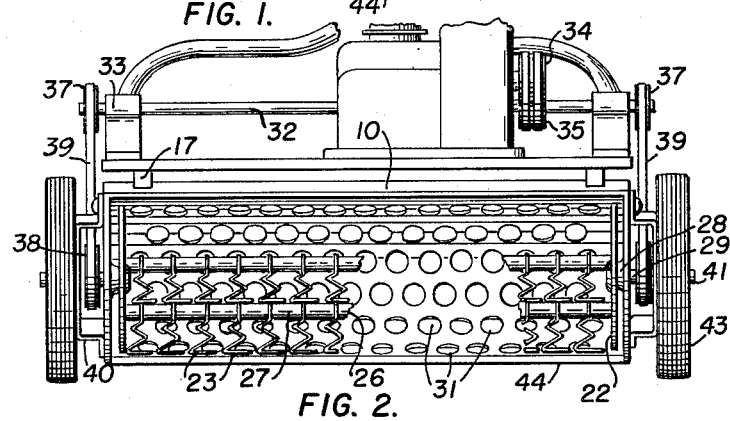
FIG. 2.
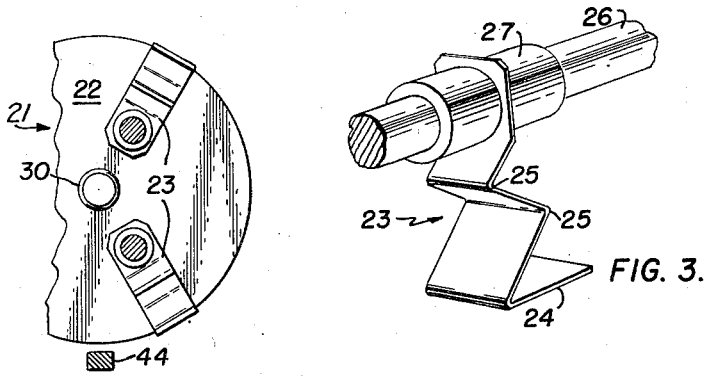
FIG. 4.
FIG. 3.
HAROLD C. FORCE
INVENTOR.
BY *Herbert J. Brown*
ATTORNEY

United States Patent Office 2,759,321
Patented Aug. 21, 1956

2,759,321

COMBINED MOWER AND MULCH MACHINE

Harold C. Force, Fort Worth, Tex.

Application January 24, 1955, Serial No. 483,536

2 Claims. (Cl. 56—249)

This invention relates to a combined mower and mulcher for cutting lawns and fertilizing the same.

An object of the invention is to provide a combined mower and mulcher which pulverizes grass as the same is being mowed.

A particular object of the invention is to provide a unique swinging blade for a combined mower and mulcher, and which blade is capable of cutting each blade of grass several times as it is mowed.

Another object of the invention is to provide a mower and mulcher wherein the larger cut blades of grass are recirculated forwardly of the mower for recutting as the mower moves forwardly on the lawn.

These and other objects of the invention will become apparent from the following description and the accompanying drawing, wherein:

Figure 1 is a side elevation and broken sectional view of a combined mower and mulcher embodying the features of the invention.

Figure 2 is an enlarged broken front elevation of the machine illustrated in Figure 1.

Figure 3 is an enlarged broken perspective view of one of the cutting blades pivotally mounted on a transverse supporting rod.

Figure 4 is an enlarged broken elevation of a circular mounting plate carrying the transverse rods and swinging cutting blades.

Figure 5 is a broken perspective view of an end of the perforated housing and showing the construction for raising and lowering the mower on the supporting wheels.

The form of the invention shown includes a generally cylindrical horizontal housing 10 which is open, as at 11, along its forward and lowered forward sides. The housing 10 is provided with circular end plates 12 which are straight and generally horizontal along the upper peripheries thereof, as at 13. As will become apparent from the description of operation, this construction provides for discharging large blades of grass forwardly of the machine during the mowing operation. A forked frame 14 is attached to the rear of the housing 10 at the ends thereof, and which frame is provided with a vertical bearing 15 in which a swiveled roller 16 is mounted. Vertical brackets 17 are secured, as by welding, on the upper surface of the cylindrical housing 10 near each end thereof, and which brackets support a horizontal plate 18 on which an engine 19 is mounted. A forked handle 20 is secured to the sides of the engine mounting brackets 17.

The cutting reel 21 is comprised of circular mounting plates 22 having transverse blade supporting rods 23 secured therebetween and at equal distances from the centers of said plates. Each rod is provided with a multiple of swinging blades 23 of sheet material, and each blade includes a horizontal outer or free end 24, together with reverse bends 25 along the length thereof. The inner end of each blade 23 is provided with a circular opening, not shown, through which the transverse rod 26 is received. Tubular spacers 27 are provided on each rod 26 for maintaining said blades in spaced relation. The circular end plates 12 of the housing 10 are provided with bearings 28 through which stub shafts 29 are mounted, the inner ends of which are secured to the centers of the circular mounting plates 22, as shown at 30 in Figure 4. As shown in Figures 1 and 2, the rear surface of the cylindrical housing 10 is perforated, as at 31, permitting the pulverized grass to pass therethrough. In the drawings, the perforations or openings 31 are enlarged in order to better illustrate the same.

A horizontal drive shaft 32 is mounted in stationary bearings 33 on opposite sides of and at the rear of the engine mounting plate 18. The drive pulleys 34 of the engine 19 are connected with intermediate pulleys 35 on the drive shaft 32 by means of belts 36. Other pulleys 37 are mounted on the outer ends of the drive shaft 32 and are connected with driven pulleys 38 on the stub shafts 29 by means of belts 39, thus supplying equalized torque at each end of the reel type cutter 21.

As shown in Figures 2 and 5, vertical adjustment is provided by means of a C-shaped bracket 40 on the outer surface of each plate 12 and has an outwardly projecting axle 41 secured at the center thereof. Each bracket 40 is pivotally connected at one end thereof on the housing end plate 12 by means of a pivot pin 42, whereas the other end of said bracket is adjustably secured in holes, not shown, by means of a screw and bolt arrangement or the like, not illustrated. Wheels 43 are mounted on the axles 41.

In operation, the reel cutter 21 is driven in a clockwise direction with reference to the position of the mower illustrated in Figure 1. The mower is propelled forwardly by pushing on the handle 20, but it is to be understood that the machine may be self-propelled within the scope and spirit of the invention. The blades 23 swing outwardly by centrifugal force, and the horizontal ends 24 of the blades mow the grass which is pushed into an upright position by a stationary transverse guide bar 44 secured between the lower inner surface of the housing end plates 12. By reason of the reverse bends 25 in the blade 23, each blade of grass is cut several times. The smaller particles of grass pass through the perforations 31 in the housing 10, but due to the blower effect of the rotating blades, the larger blades of grass are thrown forwardly of the machine where they are recut as the mower approaches the same. The cutting action on the grass tends to propel the mower forwardly, and by reason of the swivel roller 16 and the handle 20, the machine is easy to guide.

The invention is not limited to the construction herein shown and described, but may be made in various ways within the scope of the appended claims.

What is claimed is:

1. In a grass mower and mulcher, the combination of a reel type cutter and a generally cylindrical horizontal housing over the upper and rear portions of said cutter including a discharge opening at the upper forward portion thereof, said housing having perforations in its rear area, said reel type cutter being comprised of driven mounting plates at each end thereof and having blade supporting rods secured therebetween, said rods being parallel with the axis of the cutter, and swinging blades mounted on said rods along the lengths thereof, the direction of rotation of said cutter being upwardly and forwardly of the inner area of said housing.

2. In a grass mulcher and mower, the combination as defined in claim 1 and wherein said blades are comprised of reverse bends arranged for cutting the individual lengths of grass blades in several places during one cutting action.

References Cited in the file of this patent

UNITED STATES PATENTS

| | | |
|---|---|---|
| 2,506,054 | Agee et al. | May 2, 1950 |
| 2,556,446 | Roach | June 12, 1951 |
| 2,590,065 | Mott | Mar. 18, 1952 |
| 2,651,904 | Jatuun | Sept. 15, 1953 |